Patented Mar. 15, 1938

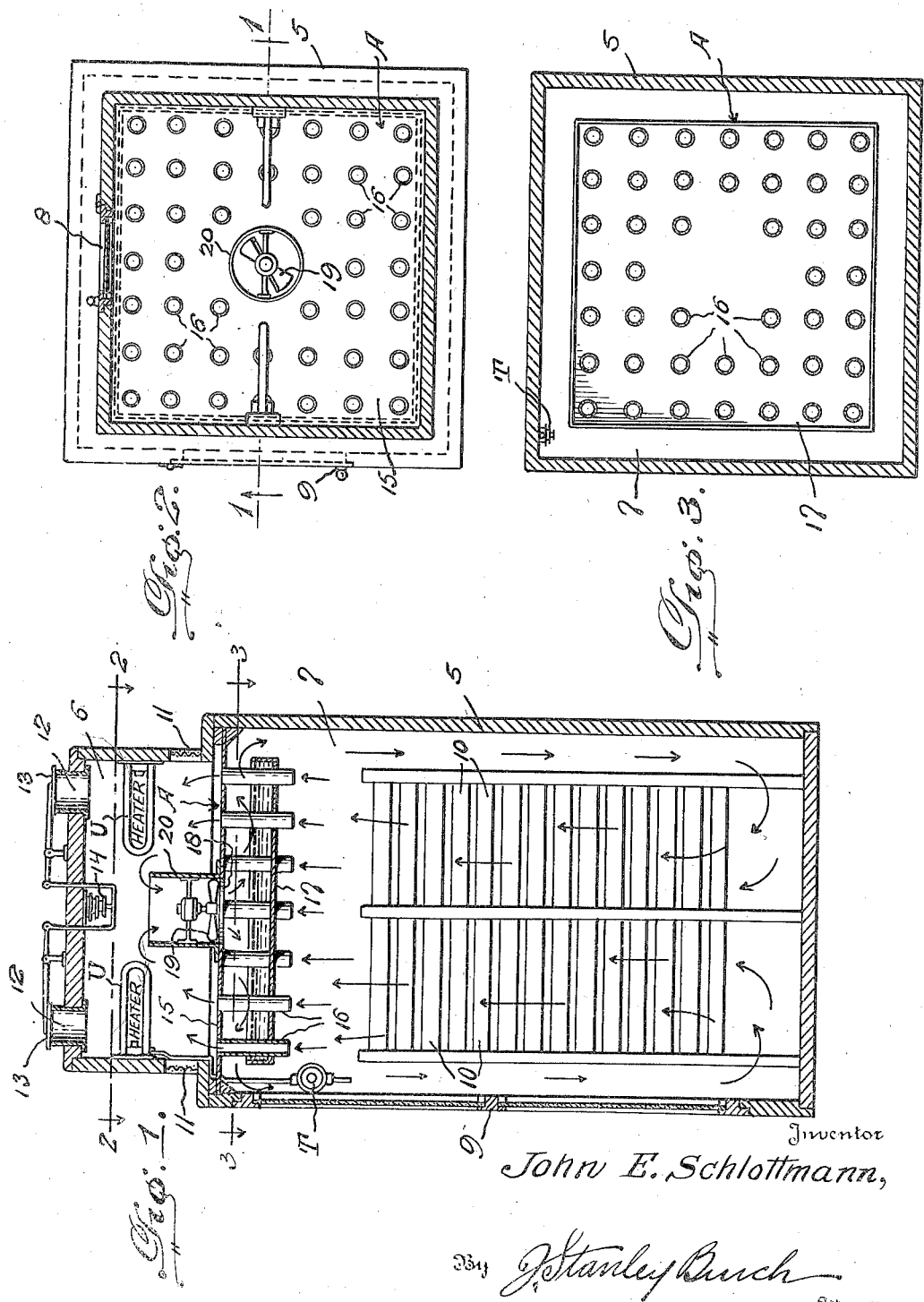

2,111,336

UNITED STATES PATENT OFFICE 2,111,336

INCUBATOR

John Emil Schlottmann, Comfort, Tex., assignor to Willie Gayle Schlottmann, Comfort, Tex.

Application June 4, 1936, Serial No. 83,582

3 Claims. (Cl. 119—35)

This invention relates to incubators, and the primary object of the present invention is to provide an improved incubator in which turning of the eggs is not necessary, in which trays without egg-turning means and known as hatching trays may be used entirely or to the exclusion of trays with egg-turning means and known as setting trays, and in which it is accordingly unnecessary to change the eggs from setting trays to hatching trays as now required and done in connection with some prior incubators.

I accomplish the above objects by the provision of means for causing the distribution or circulation of heated air in a certain definite way within the incubator, by providing means for humidifying or removing excess moisture from the air so circulated, and by providing such means in a form which will also effect the collection of down from the circulated air.

The present invention also contemplates the provision of a novel combined air distributor, humidifier and down collector adapted for use in incubators for obtaining the results stated above.

With the above objects in view, the present invention consists in the novel form, combination and arrangement of parts hereinafter more fully described, shown in the accompanying drawing and claimed.

In the drawing:

Figure 1 is a vertical sectional view of an incubator embodying the present invention, taken substantially on the plane of line 1—1 of Figure 2.

Figure 2 is a horizontal section on line 2—2 of Figure 1; and

Figure 3 is a horizontal section on line 3—3 of Figure 1.

Referring in detail to the drawing, 5 indicates the housing of the incubator which may be of any suitable or preferred construction, and in the upper portion of which is arranged an improved air distributor, humidifier and down collector A forming part of the present invention. This air distributor, humidifier and down collector divides the interior of the housing 5 into an upper chamber 6 and a relatively larger lower incubating chamber 7, access to which latter chamber may be had conveniently by means of a front door 9.

Suitably supported within the lower incubating chamber 7 in spaced relation to the vertical walls of the housing 5, are a plurality of vertical tiers of trays 10, all of which are of the type known as hatching or nursery trays which are devoid of egg-turning means. Also, the incubator may be provided with any suitable means for exhausting hot air from the chamber 6, and for automatically admitting fresh air to said chamber 6 in an emergency as will later be described. For purposes of illustration, I have simply shown the chamber 6 as provided with bottom fresh air inlets 11 and top hot air outlets 12, the latter being controlled by dampers 13 under the actuating influence of a thermostat 14. Any suitable means may be provided for heating the air within the incubator, such as electrical heating units U located in the upper chamber 6 and controlled by a thermostat T arranged in the chamber 7.

The air distributor, humidifier and down collector A consists of an upper horizontal plate or wall member 15 which acts as a partition to define the chambers 6 and 7. Rigid with and depending from the plate or wall member 15 at the major central portion thereof are a plurality of depending open-ended air tubes 16 which open at their upper ends through corresponding openings in the plate or wall member 15. These air tubes 16 support a water pan 17 in a horizontal position immediately below but spaced from the plate or wall member 15, the tubes 16 passing through the bottom of the pan 17 and being attached to such bottom in a manner to provide water tight joints where said tubes 16 pass through the same. The plate or wall member 15 further has a relatively large central opening 18 through which the air may be forced from the upper chamber 6 downwardly into the lower incubating chamber 7, the air passing through this opening being distributed or deflected laterally toward all four vertical walls of the housing 5 by the pan 17 and the water contained therein. In this way, the air is directed to all sides of the housing 5 at the top of the incubating chamber 7 for subsequent downward travel along these sides as indicated by the arrows in Figure 1, the air subsequently passing inwardly and then upwardly through the trays 10 before finally returning to the upper chamber 6 through the air tubes 16. Forced circulation of the air in this way may be had by mounting a motor-operated fan 19 directly above and in line with the opening 18, preferably within a tubular casing 20 which is open-ended and communicates at its lower end with the opening 18.

It will be particularly noted that the present incubator involves no setting trays provided with egg-turning means. In using the incubator, it is simply necessary to load the trays 10 and place them in the incubating chamber 7, set the thermostats 14 and T, and turn on the current for the motor of fan 19 and the heaters U. No attention to the incubator or eggs is necessary until after the hatch is completed. This is true because of the peculiar circulation of air had by the construction described, by reason of the fact that the air is properly humidified when too dry by contact with the water in the pan 17, by reason of the fact that excess moisture is removed from the heated air by contact with such water in pan 17 acting as a condensing medium, and by reason of the fact that any down in the trays 10 which is picked up by the air in its flow upwardly to and through the tubes 16 is ultimately removed from the air when subsequently forced downwardly through the opening 18 in contact with the water in the pan 17. The down is thus collected in the water placed within pan 17.

Any suitable means may be provided to facilitate replenishing of the supply of water in pan 17. For instance, by opening door 8, additional water may be poured into pan 17 through the opening 18.

From the foregoing description, it is believed that the construction and operation, as well as the advantages of the present invention will be readily understood and appreciated by those skilled in the art. Obviously, the invention is susceptible of many different embodiments and various changes in the details of construction illustrated and described. It will be noted that if thermostat T fails to properly operate to cut off the heaters U, the thermostat 14 will open dampers 13 to let in cool air and prevent overheating of the circulated air within the incubator.

What I claim as new is:

1. In an incubator, an air distributor, humidifier and down collector comprising a horizontal supporting plate, a plurality of open-ended air tubes depending from the major central portion of said plate and opening through the latter at their upper ends, said plate having a relatively large central air intake opening, a fan for drawing air upwardly through said air tubes and forcing the air downwardly through said air intake opening, and a water pan supported by said tubes beneath said plate, said tubes passing through the bottom of said water pan, said water pan being of a size slightly smaller than said plate for deflecting the air laterally in all directions as it passes downwardly through said air intake opening.

2. In an incubator, a housing, a horizontal wall member dividing the interior of said incubator housing into an upper chamber and a larger lower incubating chamber, tiers of hatching trays within said incubating chamber and spaced from all of the vertical walls of said housing, said trays all being of the hatching type having no egg-turning means, a plurality of air-return tubes depending from said horizontal wall member and opening through the latter at their upper ends, a water pan supported by said tubes directly below and in spaced relation to said horizontal wall member, said tubes passing through the bottom of said water pan, said water pan being of a size slightly smaller than said horizontal wall member to direct laterally to all sides of the incubator housing air supplied to the space between said wall member and said water pan, said horizontal wall member having a central air inlet opening through which air may pass from said upper chamber to the space between said horizontal wall member and said water pan, and a fan for drawing air upwardly through said air tubes and forcing the air downwardly through said air inlet opening.

3. In an incubator, an incubator housing, a horizontal wall member dividing the interior of said housing into an upper chamber and a larger lower incubating chamber, a horizontal deflector arranged beneath said horizontal wall member and spaced from the vertical sides of said housing, said horizontal wall member having a central air inlet opening permitting passage of air from the upper chamber to said lower incubating chamber, air tubes carried by said horizontal wall member, a fan for drawing air upwardly through said air tubes and forcing the air downwardly through said air inlet opening, said air tubes depending from the major central portion of said horizontal wall member and opening through the latter at their upper ends, said tubes passing through said deflector.

JOHN EMIL SCHLOTTMANN.